(12) United States Patent
Yokokita

(10) Patent No.: US 11,499,027 B2
(45) Date of Patent: Nov. 15, 2022

(54) FIBER-REINFORCED FOAM PARTICLE MOLDED ARTICLE AND PRODUCTION METHOD THEREFOR

(71) Applicant: UBE EXSYMO CO., LTD., Tokyo (JP)

(72) Inventor: Masahiko Yokokita, Hashima (JP)

(73) Assignee: UBE EXSYMO CO., LTD., Tokyo (JP)

(*) Notice: Subject to any disclaimer, the term of this patent is extended or adjusted under 35 U.S.C. 154(b) by 382 days.

(21) Appl. No.: 16/488,487

(22) PCT Filed: Feb. 27, 2018

(86) PCT No.: PCT/JP2018/007206
§ 371 (c)(1),
(2) Date: Aug. 23, 2019

(87) PCT Pub. No.: WO2018/159597
PCT Pub. Date: Sep. 7, 2018

(65) Prior Publication Data
US 2019/0382548 A1 Dec. 19, 2019

(30) Foreign Application Priority Data
Feb. 28, 2017 (JP) .............................. JP2017-036160

(51) Int. Cl.
*B32B 5/08* (2006.01)
*C08J 9/00* (2006.01)
(Continued)

(52) U.S. Cl.
CPC ............. *C08J 9/0085* (2013.01); *B29C 44/12* (2013.01); *B29C 44/588* (2013.01); *B32B 5/245* (2013.01);
(Continued)

(58) Field of Classification Search
CPC ...... B32B 5/245; B32B 5/08; B32B 2266/025; B32B 2262/12; B32B 2262/128;
(Continued)

(56) References Cited

U.S. PATENT DOCUMENTS

2012/0302118 A1* 11/2012 Kasuya ................. B29C 70/465
525/240

FOREIGN PATENT DOCUMENTS

CN 102493051 A 6/2012
CN 102770480 A 11/2012
(Continued)

OTHER PUBLICATIONS

International Search Report for PCT/JP2018/007206, dated May 15, 2018, and English Translation submitted herewith (5 pages).
(Continued)

*Primary Examiner* — Matthew D Matzek
(74) *Attorney, Agent, or Firm* — Fitch, Even, Tabin & Flannery LLP

(57) ABSTRACT

The present invention can provide a fiber-reinforced expanded particle molded article having a reinforcing material fused and integrated with the surface of an expanded molded article, wherein the reinforcing material is a fabric or a braided product produced by weaving a linear composite material produced by melting and integrating a thermoplastic fiber comprising a low-melting component fiber and a high-melting component fiber, as two or more threads selected from the group consisting of a warp, a weft and a slant thread, the fiber-reinforced expanded particle molded article exhibiting an excellent reinforcing effect; and a method for economically producing the molded article by in-mold molding with a small number of steps.

5 Claims, 6 Drawing Sheets

(51) Int. Cl.
  *B29C 44/12*   (2006.01)
  *B29C 44/58*   (2006.01)
  *B32B 5/24*   (2006.01)
  *C08J 9/232*   (2006.01)
  *C08L 23/12*   (2006.01)
  *C08L 23/26*   (2006.01)
  *D03D 15/00*   (2021.01)
  *D03D 15/283*   (2021.01)
  *D03D 15/587*   (2021.01)
  *B29K 701/12*   (2006.01)
  *B29L 9/00*   (2006.01)

(52) U.S. Cl.
  CPC .............. *C08J 9/232* (2013.01); *C08L 23/12* (2013.01); *C08L 23/26* (2013.01); *D03D 15/00* (2013.01); *D03D 15/283* (2021.01); *D03D 15/587* (2021.01); *B29K 2701/12* (2013.01); *B29K 2713/00* (2013.01); *B29L 2009/00* (2013.01); *B32B 2266/025* (2013.01); *C08L 2203/14* (2013.01); *C08L 2205/025* (2013.01); *C08L 2205/03* (2013.01); *C08L 2205/16* (2013.01); *C08L 2207/06* (2013.01)

(58) Field of Classification Search
  CPC ..... C08J 9/228; C08J 9/232; C08J 9/22; C08J 9/24; B29C 44/12; D03D 15/00; D03D 15/20; D03D 15/292; D03D 15/47

USPC ....... 442/199, 201, 221, 239, 200, 203, 204; 428/36.5, 304.4

See application file for complete search history.

(56)     References Cited

FOREIGN PATENT DOCUMENTS

| | | |
|---|---|---|
| CN | 103509238 A | 1/2014 |
| JP | S58-145739 A | 8/1983 |
| JP | H04-002093 B2 | 1/1992 |
| JP | H05-81576 A | 4/1993 |
| JP | H05-147121 A | 6/1993 |
| JP | H06-114957 A | 4/1994 |
| JP | H07-290483 A | 11/1995 |
| JP | H08-081576 A | 3/1996 |
| JP | 2013-126790 A | 6/2013 |
| JP | 2015-047757 A | 3/2015 |

OTHER PUBLICATIONS

UBE Exsymo Co., Ltd., "Introduction of the Simtext Conjugate Filament," 2017 (7 pages).

* cited by examiner

[Fig. 1]
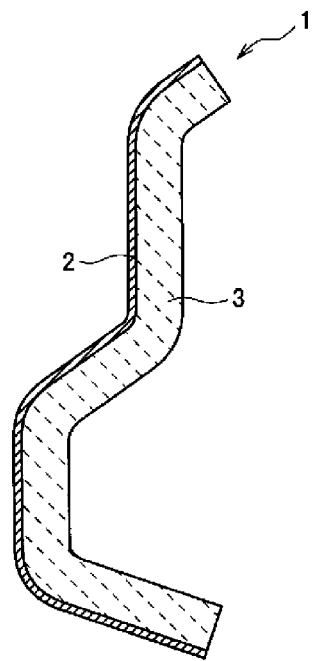
[Fig. 2]
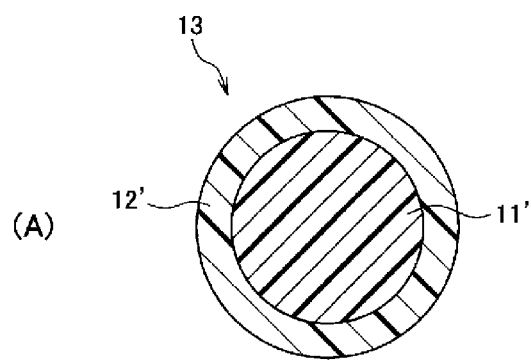
(A)
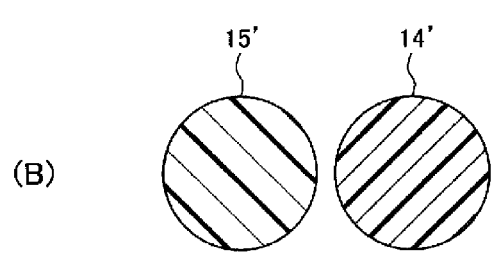
(B)

[Fig. 3]
(A) 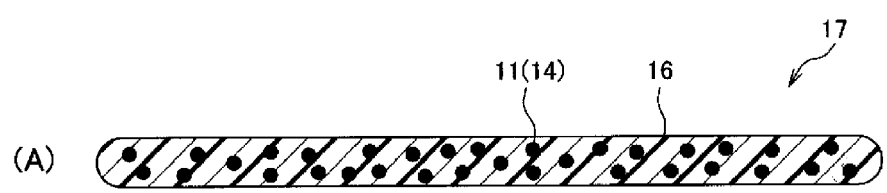
(B) 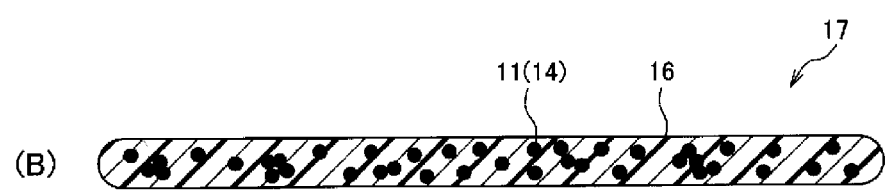
(C) 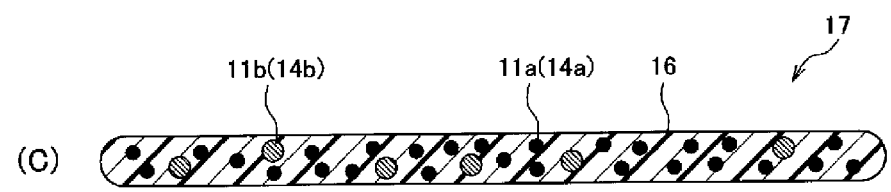

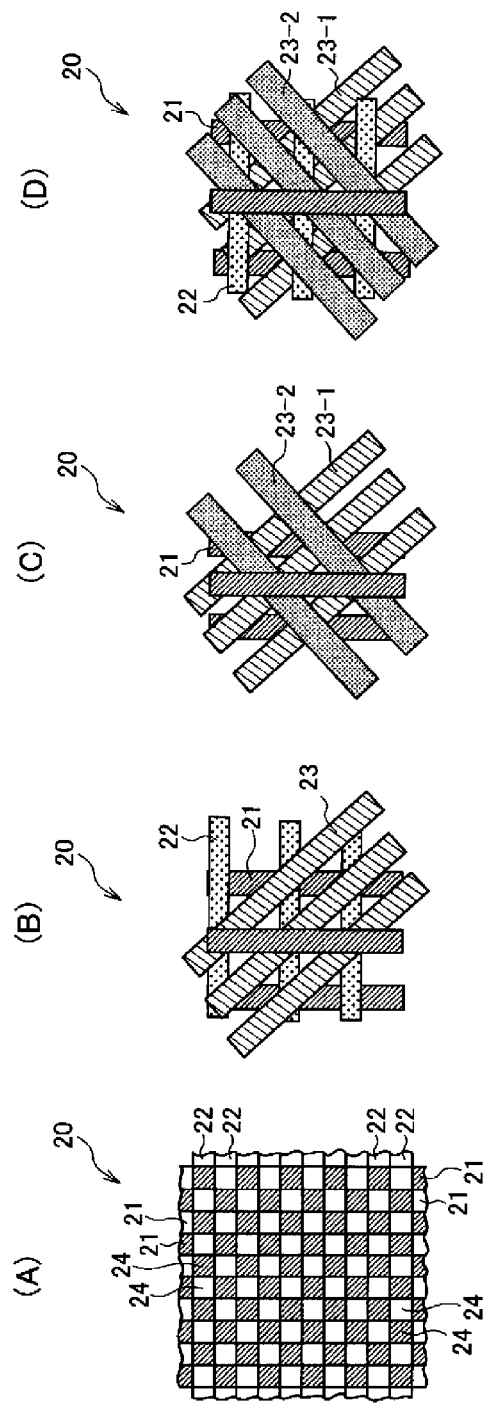

[Fig. 5]
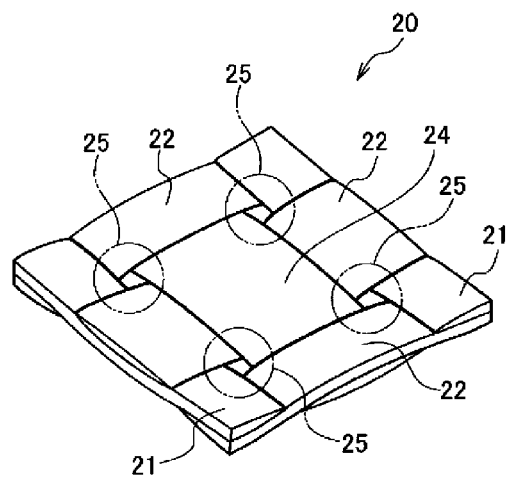

[Fig. 6]
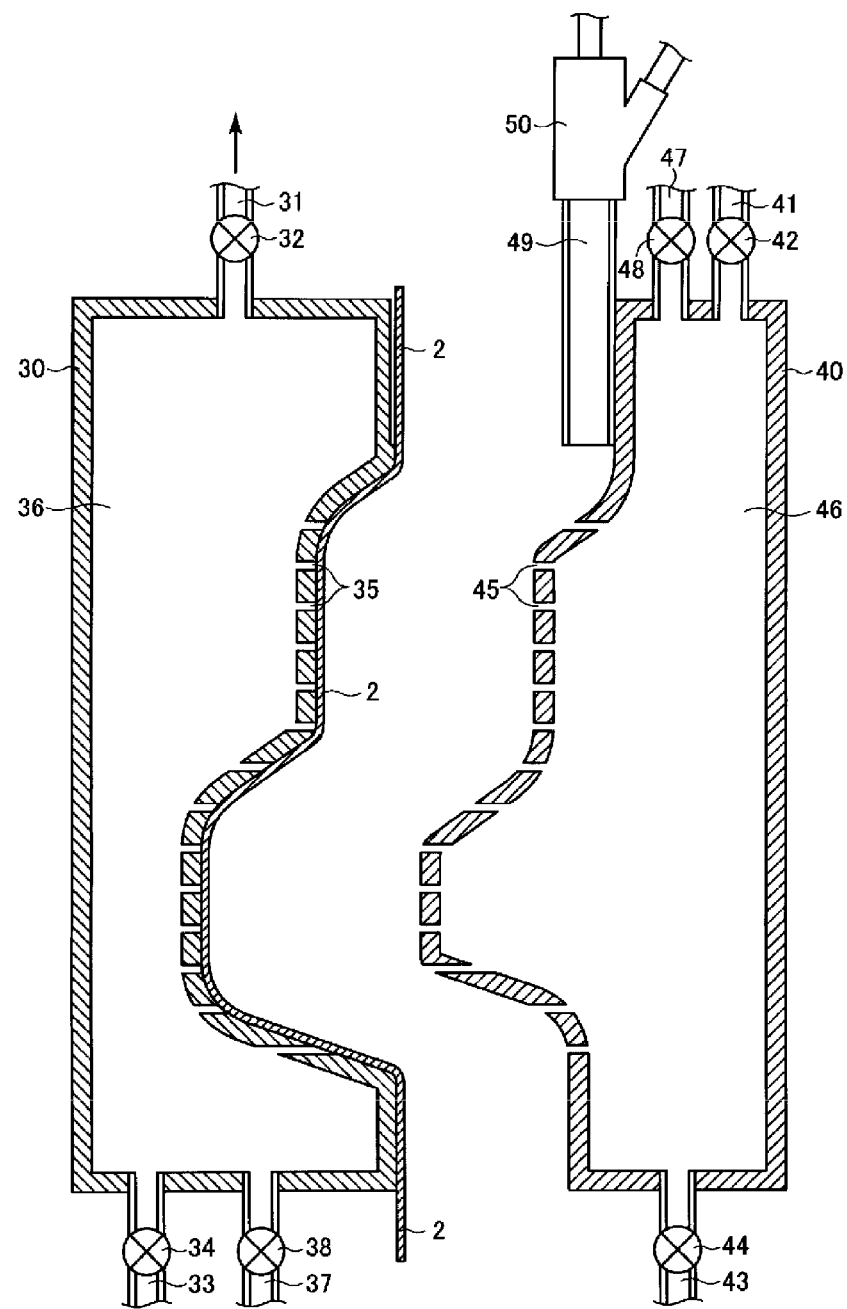

[Fig. 7]
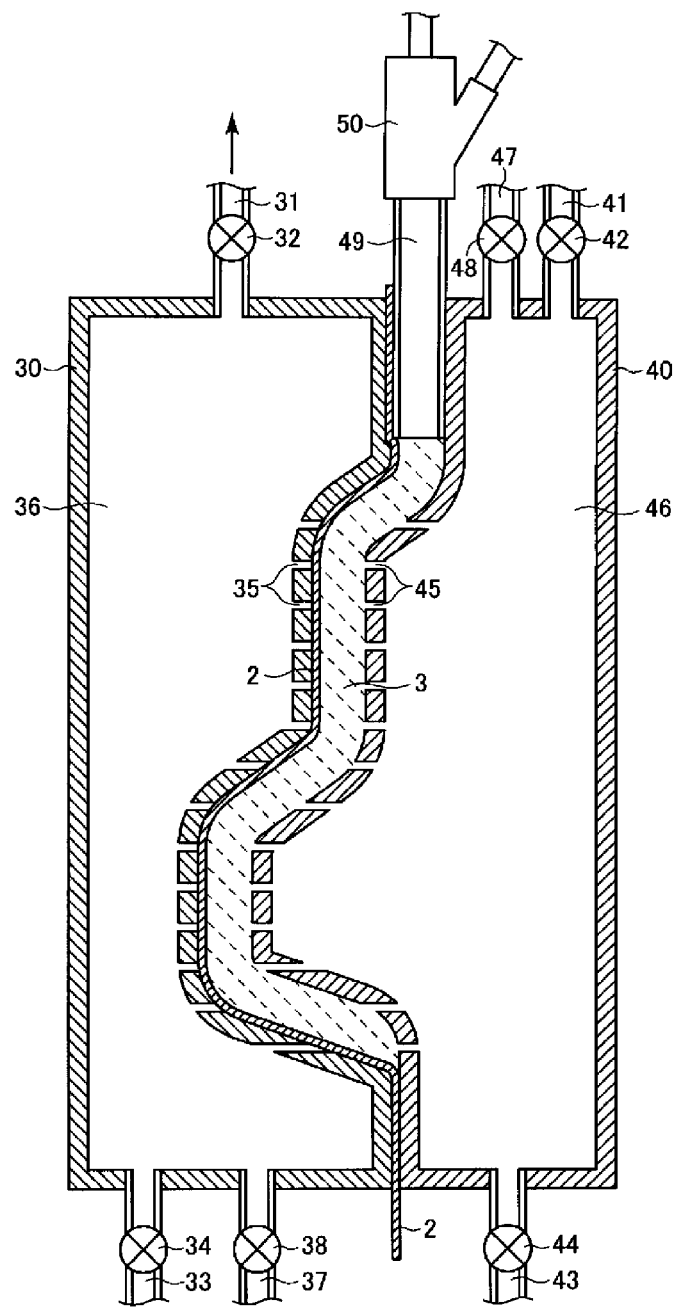

FIBER-REINFORCED FOAM PARTICLE MOLDED ARTICLE AND PRODUCTION METHOD THEREFOR

CROSS-REFERENCE TO RELATED APPLICATIONS

This application is a U.S. national phase application filed under 35 U.S.C. § 371 of International Application Number PCT/JP2018/007206, filed Feb. 27, 2018, designating the United States, which claims priority from Japanese Application Number 2017-036160, filed Feb. 28, 2017.

Field of the Invention

The present invention relates to a fiber-reinforced expanded particle molded article having a reinforcing material fused and integrated with the surface of an expanded particle molded article, and a production method therefor.

Background of the Invention

Fiber-reinforced thermoplastic resin articles (hereinafter sometimes referred to as "FRTPs") having reinforcing fibers impregnated with thermoplastic resins can be plastically deformed by heating, and therefore, have found applications as fiber-reinforced composite materials with plastic molded materials and expanded molded articles to be thermally shaped.

On the other hand, expanded molded articles produced using resin expanded particles (expanded beads) having thermoplastic resin particles impregnated with a blowing agent have properties such as lightweight properties, heat insulating properties, sound absorbency and shock absorption, and therefore, have been used in various applications such as heat insulating materials, cushioning and packaging materials, automobile interior members and core materials for automobile bumpers. Fiber-reinforced composites having an expanded molded article laminated to FRTP have been also proposed, but improvement in adhesion between the expanded molded article and the FRTP layer requires an adhesive, which is a disadvantage in weight reduction. In the case of integration by heat fusion, materials are required to be heated. The expanded molded article that has been subjected to in-mold molding functions as a heat insulating material, and the interface between the expanded molded-article and the FRTP layer is shaped by heating from a further surface and is therefore easily warped. In addition, a control device (for example, a thickness control mechanism referred to as a spacer such as a metal frame) is required for thickness control. Further, since the expanded molded article layer is compressed during hot pressing, the bulk density in the thickness direction changes to generate a density gradient and the reduction in thickness cannot be avoided.

Although various methods for producing an expanded molded article are known such as chemical foaming and foaming using moisture, among which bead expanding is a method in which expanding beads are filled in molds and thermally expanded. However, in order to obtain FRTP expanded composite with an expanded molded article having beads well fused together, permeability of vapor as a heating medium is necessary for in-mold molding of the beads at the same time as a reinforcing material (a surface layer with a reinforcing layer).

Patent Literature 1 proposes a method for producing a bead expanded molded article with a skin layer in which the skin layer comprising a skin and a breathable sheet attached to the back side of the skin was molded in molds, for example, by vacuum molding; filling expandable resin beads in a cavity between the clamped molds; and introducing a heating medium through the breathable sheet to foam the filled beads. Patent Literature 1 states that a thermoplastic resin sheet of 0.05 to 1.0 mm or that having an embossed pattern formed on the surface thereof is used as the skin of the skin layer, and an open cell foam, for example, of polyurethane or a nonwoven fabric is used as a breathable sheet attached to the back side of the skin.

This method has problems that the skin is a thermoplastic resin sheet and cannot be expected to have a reinforcing effect as high as the FRTP layer with respect to the mechanical strength; and the method requires a step of attaching the skin to the breathable sheet so as to form the skin layer and therefore cannot avoid increasing cost due to, for example, increased number of steps and material cost.

CITATION LIST

Patent Literature

PTL1: JP 04002093 B

SUMMARY OF INVENTION

An object of the present invention is to solve the above-described problems and to thereby provide a fiber-reinforced expanded particle molded article having a reinforcing effect by an excellent fiber reinforcement as well as a method for economically producing the fiber-reinforced expanded particle molded article by in-mold molding with a small number of steps.

The present inventor has intensively studied a fiber-reinforced expanded particle molded article having a reinforcing material fused and integrated with at least one surface of an expanded molded article of resin expanded particles and a method of in-mold molding it. As a result, the inventor has found that the above-described object can be achieved by producing a fiber-reinforced expanded particle molded article wherein the reinforcing material is a fabric or a braided product produced by weaving a linear composite material produced by melting and integrating a thermoplastic fiber comprising a low-melting component fiber as a matrix component and a high-melting component fiber as a fiber reinforcement, as two or more threads selected from the group consisting of a warp, a weft and a slant thread, and the reinforcing material is fused and integrated with the surface of the expanded molded article, thereby leading to the present invention.

That is, the present invention provides the following [1] to [7].

[1] A fiber-reinforced expanded particle molded article having a reinforcing material fused and integrated with at least one surface of an expanded molded article formed of resin expanded particles,
wherein the reinforcing material is a fabric or a braided product produced by weaving a linear composite material, which is produced by melting and integrating a thermoplastic fiber comprising a low-melting component fiber as a matrix component and a high-melting component fiber as a fiber reinforcement, as two or more threads selected from the group consisting of a warp, a weft and a slant thread, and the reinforcing material is fused and integrated with the surface of the expanded molded article.

[2] The fiber-reinforced expanded particle molded article according to [1], wherein the reinforcing material is in the form of a sheet produced by fusing and integrating intersecting points where two or more threads intersect with each other after weaving the linear composite material satisfying the following requirements (i) to (iv); the reinforcing material has a thickness of 0.1 mm or more and 5 mm or less and an air impermeability of 0.05 to 0.5 seconds/100 ml as measured by a method using a Gurley testing machine in accordance with JIS P 8117; and the matrix component of the reinforcing material and the surface of the expanded molded article are fused and integrated during in-mold molding:

(i) the linear composite material comprises one or more high-melting component fibers;

(ii) the high-melting component fiber of the linear composite material has a crystallinity of 60% or more as measured at a temperature increasing rate of 30° C./min with a differential scanning calorimeter according to melting calorimetry;

(iii) the linear composite material has a Young's modulus in tension at 120° C. of 7 cN/dtex or more; and (iv) the linear composite material has a shrinkage of 8.5% or less after treatment at 140° C. for 30 minutes.

[3] The fiber-reinforced expanded particle molded article according to [1] or [2], wherein the low-melting component fiber of the linear composite material comprises a polyolefin resin; the high-melting component fiber of the linear composite material comprises a crystalline thermoplastic resin having a melting point higher by 20° C. or more than the polyolefin resin; and the resin expanded particle is an expanded-particle having an outer layer comprising a polyolefin resin that can be fused with the matrix component composed of the low-melting component fiber at least on the surface thereof.

[4] The fiber-reinforced expanded particle molded article according to any one of [1] to [3], wherein the expanded particle is a multilayered expanded particle comprising a core layer and an outer layer covering an outer periphery of the core layer, the core layer being a crystalline polyolefin resin and the outer layer comprising a polyolefin resin having a melting point lower by 5 to 60° C. than the core layer.

[5] The fiber-reinforced expanded particle molded article according to any one of [1] to [4], wherein the reinforcing material is formed by weaving the linear composite material in the form of any weave selected from the group consisting of plain weave, satin weave or diagonal weave or a combination thereof.

[6] A method for producing a fiber-reinforced expanded particle molded article, the method comprising: setting a reinforcing material on the a mold surface of at least one of first and second molds with both molds open and clamping the molds; then filling a expandable resin particle in a cavity formed by the first and second molds; and introducing a heating medium into the cavity through vent holes open on the mold surface of the mold to thermally expand the expandable resin particles, wherein the reinforcing material used is a reinforcing material comprising a high-melting component fiber that does not melt at an in-mold molding temperature of an expanded molded article and a matrix component that is interposed between the high-melting component fibers and melts at the in-mold molding temperature; and the expandable resin particles filled in the cavity are expanded by the heating medium at the in-mold molding temperature to fuse resin expanded particles together, while the matrix component of the reinforcing material adjoining the expanded molded article is molten to fuse and integrate the reinforcing material with the surface of the expanded molded article.

[7] The method for producing a fiber-reinforced expanded particle molded article according to [6], wherein the first and second molds have the vent holes open on the mold surfaces thereof; the vent holes on the mold surfaces of the molds make an opening system alternately or the vent holes on the mold surface of one of the molds make an opening system; and heated vapor is fed toward the mold surface of the mold of the opening system through the vent holes on the other mold surface, for in-mold molding.

According to the present invention, a fiber-reinforced expanded particle molded article having a reinforcing effect by an excellent fiber reinforcement can be provided.

According to the present invention, a method for producing a fiber-reinforced expanded particle molded article having an expanded particle molded article and a reinforcing material including a fiber reinforcement fused and integrated can be provided.

In addition, the method of the present invention can provide the final product having a desired geometry by in-mold molding and thereby provide design flexibility by in-mold molding, and can reduce the cost due to reduction in the adhesive cost and the number of steps, reduce the production equipment cost and deliver a product within a short duration, as compared with production methods in which a reinforcing material and an expanded molded article are bonded in a separate step.

BRIEF DESCRIPTION OF DRAWINGS

FIG. 1 is a schematic cross-sectional view showing one example of a fiber-reinforced expanded particle molded article of the present invention.

FIG. 2 is a cross-sectional view schematically showing configurations of (A) a conjugated fiber and (B) a mixed fiber of a low-melting component fiber and a high-melting component fiber, as aspects of a thermoplastic fiber used for a linear composite material according to the present invention.

FIG. 3 is a cross-sectional view schematically showing example structures (A), (B) and (C) in which each linear composite material has been obtained by bundling a plurality of the conjugated fibers shown in FIG. 2 (A) or the mixed fibers shown in FIG. 2 (B) and hot drawing them.

FIG. 4 is an illustration of (A) a reinforcing material comprising a sheet-like fabric produced by weaving a linear composite material in the form of weave of a plain weave and fusing and integrating the intersecting points between a warp and a weft; (B) a reinforcing material comprising a sheet-like fabric produced by using a linear composite material as component threads of a triaxial braided fabric and fusing and integrating the intersecting points where a warp, a weft and a slant thread intersect with each other; (C) a reinforcing material comprising a sheet-like fabric produced by using a linear composite material as component threads of a triaxial braided fabric and fusing and integrating the intersecting points where a warp and two types of slant threads intersect with each other; and (D) a reinforcing material comprising a sheet-like fabric produced by using a linear composite material as component threads of a tetraaxial braided fabric and fusing and integrating the intersecting points where a warp, a weft and two types of slant threads each having a different direction intersect with each other.

FIG. 5 is an illustration of interstices near the corners of an intersecting point where a warp and a weft in a reinforcing material intersect with each other.

FIG. 6 is a cross-sectional view of molds of which a first mold has a reinforcing material set on the mold surface thereof.

FIG. 7 is a schematic cross-sectional view showing the molds having expandable resin particles in an expanded and fused state obtained by filling the expandable resin particles in a cavity between the molds shown in FIG. 6, clamping the molds and expanding and fusing expandable resin particles.

DESCRIPTION OF EMBODIMENTS

Hereinafter, the present invention will be described with reference to the drawings. In the present invention, the drawings are illustrative of the technical idea of the present invention, and the dimensional balance of each component member and among the component members, elements and the like are not limited to those shown in the drawings.

FIG. 1 shows a cross-sectional view of one example of a fiber-reinforced expanded particle molded article 1 of the present invention having, a reinforcing material 2 and an expanded molded article 3 formed of resin expanded particles, fused and integrated, such that the reinforcing material 2 is disposed on the front side of the article.

<Expanded Molded Article>

An expanded molded article constituting a fiber-reinforced expanded particle molded article of the present invention can be obtained by expanding (secondarily expanding) expandable resin particles (beads) filled in molds having desired shapes with a heating medium.

The expandable resin particles used in the present invention are selected from the group consisting of thermoplastic resins that can be fused and integrated with a low low-melting component fiber constituting a thermoplastic fiber during in-mold molding. Examples of the thermoplastic resin used in the expandable resin particles include a polyolefin resin, a polystyrene resin and a polyurethane resin. For example, in case of expanded molded articles for automobile parts, among them, a polyolefin resin such as a polypropylene resin or a polyethylene resin is preferable from the viewpoint of recyclability and heat resistance.

<Resin Expanded Particles>

In order to obtain resin expanded particles, when using a volatile blowing agent as an additive for a thermoplastic resin, it is preferable that 0.005 to 0.1 parts by mass of an inorganic nucleating agent such as talc, silica or calcium carbonate is added based on 100 parts by mass of the thermoplastic resin. When using an inorganic blowing agent such as air, nitrogen, carbon dioxide gas or water, it is preferable to use the above-described inorganic nucleating agent and/or a water absorbing substance.

A melt tension modifier, a nucleating agent, a water absorbent, a surfactant-type or polymer-type antistatic agent, a pigment, a flame retardancy improver, a conductivity improver or the like may be added if necessary to the thermoplastic resin. The addition is preferably performed by adding it in a molten resin during the process of producing resin particles as described later.

Thermoplastic resin particles can be usually melt processed beforehand with an extruder, a kneader, a Banbury mixer, a roll or the like to give them a desired shape such as a cylindrical, an elliptical, spherical, cubic, or rectangular shape, so that they are easily used for expanding. Generally, when producing thermoplastic resin particles, a desired additive is usually added to a thermoplastic resin by dry blending or masterbatch blending and melt kneaded in an extruder, and then subjected to such a method as an underwater cut method in which the melt is extruded into a strand shape from dies at the tip of the extruder and sufficiently cooled in a bath or the like to form a strand and the strand was cut to form particles, or the resin is directly discharged from dies into water while cutting it into particles. Examples of the extruder that can be used include a single screw extruder or a twin screw extruder.

The prepared thermoplastic resin particle may be deformed during reheating, particularly during expanding and may be poorly filled in molds before molded, depending on the shape after deformation. The shape of the thermoplastic resin particles is therefore preferably adjusted as appropriate.

The average particle weight of the thermoplastic resin particle is preferably 0.5 to 3.0 mg, more preferably 0.5 to 2.0 mg, and still more preferably 0.5 to 1.5 mg.

The resin expanded particles used in the present invention can be obtained by expanding the above-described thermoplastic resin particles under the conditions described later.

The blowing agent used in producing the resin expanded particles include an aliphatic hydrocarbon such as propane, isobutane or isopentane; an inorganic gas such as air, nitrogen or carbon dioxide; and water, and it may be used alone or in combination of two or more. The amount of the blowing agent used varies depending on the desired expansion ratio, but is 5 to 100 parts by weight based on 100 parts by weight of a thermoplastic resin.

Resin expanded particles can be prepared by placing a dispersion comprising thermoplastic resin particles, a blowing agent, water, a dispersant and a dispersion aid in a pressure vessel, heating it to a predetermined temperature, and discharging it under pressure from the pressure vessel to an atmosphere having a pressure lower than the pressure vessel.

Such particles may be referred to as "one-stage expanded particles".

When the expansion ratio in one-stage expanding is, for example, 20 or less, the one-stage expanded particles are placed in a closed vessel and subjected to pressure treatment comprising impregnation with nitrogen, air or the like to make the pressure within the one-stage expanded particles higher than normal pressure, and then further expanded by heating them with steam or the like, so that thermoplastic resin expanded particles having a expansion ratio of 20 or more and 35 or less or the like can be provided. Herein, further expanding of the one-stage expanded particles may be referred to as "two-stage expanding", and the expanded particles obtained by the two-stage expanding may be referred to as "two-stage expanded particles".

<Expanded Particle Molded Article>

When using resin expanded particles for in-mold expanded molding, a conventional known method can be used such as a) a method of using them as it is, b) a method of pressing an inorganic gas such as air into resin expanded particles beforehand to give expanding ability or c) a method of filling resin expanded particles in a compressed state in molds and molding it in molds.

The method for producing a fiber-reinforced expanded particle molded article of the present invention will be described later separately.

<Reinforcing Material>

In the present invention, a reinforcing material is fused and integrated with at least one surface of an expanded molded article formed of resin expanded particles.

The reinforcing material used in the present invention is a reinforcing material in the form of a fabric or a braided product produced by weaving a linear composite material produced by melting and integrating a thermoplastic fiber comprising a low-melting component fiber and a high-melting component fiber, as two or more threads selected from the group consisting of a warp, a weft and a slant thread.

The state of the fabric weave configured by weaving is not particularly limited, but the number of fibers is preferably 5 to 20 fibers/inch and more preferably 10 to 17 fibers/inch in order to obtain a reinforcing effect. If reinforcing in a particular direction is desired, the number of fibers can be increased in one direction of the weave.

When the number of fibers is large, the reinforcing effect can be obtained but the permeability of vapor is poor. In contrast, when the number is small, the permeability of vapor is good but the reinforcing effect is reduced.

The thermoplastic fiber, which comprises a plurality of unstretched conjugated fibers comprising a low-melting component and a high-melting component in a monofilament, or a mixture of a separate unstretched low-melting component fiber and a separate unstretched high-melting component fiber in an aligned state, is hot drawn at a temperature above the melting point of the low-melting component fiber to melt the low-melting component fiber so as to obtain a linear composite material having the low-melting component in the form of matrix and having the high-melting component fiber dispersed in the matrix. The linear composite material is then woven as two or more threads selected from the group consisting of a warp, a weft and a slant thread, for example, with a textile weaving loom to obtain a reinforcing material in the form of a fabric or a braided fabric. The reinforcing material may be used by simply laminating a plurality of sheets of fabric or braided fabric, but it may be a multilayer laminate having the sheets of fabric or braided fabric connected together with a connecting thread, or a three-dimensional fabric (multiple weave) having a warp penetrated between layers of fabric.

The above reinforcing material has the low-melting component of the linear composite material as a matrix component and has the matrix component fused and integrated with the surface of the expanded molded article formed of resin expanded particles, and as a result, it develops a performance as a reinforcing material for an expanded particle molded article. That is, the high-melting component fiber of the reinforcing material in the form of a sheet develops the function as a fiber reinforcement and thereby develops a high degree of reinforcing performance for an expanded molded article. On the other hand, the low-melting fiber component is required to develop both the function as a matrix component for binding the high-melting component fiber and the function of fusing and integrating the reinforcing material with the surface of the expanded molded article formed of resin expanded particles.

The substrate for the expandable resin particles constituting the resin expanded particles is required to be a substrate having compatibility, affinity and the like with the matrix component of the linear composite material so as to form a structure fused and integrated with the matrix component thereof on the surface of the expanded molded article.

From this viewpoint, the resin expanded particle is required to have a surface component having thermal fusibility with the matrix component of the reinforcing material at least on its surface. Therefore, the resin expanded particle preferably contains a polyolefin resin at least on its surface. That is, at least the surface of the resin expanded particle is preferably composed of a polyolefin resin alone, or a mixed resin of a polyolefin resin and another resin, or a copolymer of a polyolefin resin and another resin.

The resin expanded particle may also be a multilayered expanded particle comprising an expandable core component and an outer layer covering the core component.

The thermoplastic resin constituting the outer layer of the multilayered expanded particle is preferably a polyolefin resin, when the low-melting component fiber is a matrix component composed of a polyolefin resin.

The skin component of the outer layer is not always required to be present all around the periphery of the expandable core component, and it is sufficient that the skin component is present to such an extent that it can be fused and integrated with the reinforcing material.

In addition, the outer layer of the multilayered expanded particle may be of a polyolefin resin having a melting point lower by 5 to 60° C. than the core layer. When the outer layer is of a polyolefin resin having a melting point lower by 5 to 60° C. than the core layer, the outer layer is easily fused and integrated with the matrix component of the reinforcing material during in-mold molding, and a fiber-reinforced expanded particle molded article having high fusion strength can be obtained.

(Thermoplastic Fiber)

A thermoplastic fiber for forming a reinforcing material used in the present invention comprises a low-melting component fiber and a high-melting component fiber, as described above. Aspects of the thermoplastic fiber may be a fiber bundle composed of at least two unstretched conjugated fibers 13 comprising an unstretched low-melting component 12' and an unstretched high-melting component 11' in an unstretched monofilament (one fiber) 13, as shown in FIG. 2(A), and alternatively a fiber bundle composed of at least two fibers produced by mixing (blending) and aligning an unstretched low-melting component fiber 15' and an unstretched high-melting component fiber 14' each of which is a single fiber, as shown in FIG. 2(B).

Blending of single fibers 14 and 15 is performed by blending single unstretched fibers 14' and 15' thereof at a stage in which stretching of fibers has not yet been performed and hot drawing them at a temperature not less than the melting point of the low-melting component fiber 15 which is a single fiber and not more than the melting point of the high-melting component fiber 14 which is a single fiber. Thereafter, a linear composite material 17 that has the high-melting component fiber 14, as a fiber developing a reinforcing effect, dispersed in the matrix 16 composed of the molten low-melting component, as shown in FIG. 3(A), is wound up, and is subjected to a weaving step with a textile weaving loom or the like. The method used for obtaining a blended thread at a stage in which stretching of the fibers has not yet been performed can include a method in which a low-melting component fiber and a high-melting component fiber, each of which is a single fiber, are suspended on a creel by the number required depending on the fineness required for the linear composite material 17, and are inserted into the blending unit while taking them from the creel. The blended thread obtained after passage through the blending unit is continuously fed into a stretching machine and stretched therewith to form the linear composite material 17 as described above.

However, without the blending unit and at the stage of spinning unstretched fibers, it is also possible to discharge a low-melting component fiber 15 and a high-melting component fiber 14 from multiple spinning nozzle units for each fiber separately arranged within the same spinning nozzle to obtain an unstretched thermoplastic fiber composed of the low-melting component fiber 15 and the high-melting component fiber 14, each of which is single component-based fiber, and to stretch it to obtain a linear composite material 17 having two types of fibers integrated therein.

In order to obtain a linear composite material from an unstretched conjugated fiber 13 comprising a low-melting component 12' and a high-melting component 11' in an unstretched monofilament as shown in FIG. 2(A), spinning can be performed from a conjugated fiber spinning machine with spinning holes (nozzles) capable of merging the low-melting component and the high-melting component and discharging the merged components through a single hole, to obtain the unstretched conjugated fiber, which is stretched in a predetermined temperature range.

(Low-Melting Component Fiber or Low-Melting Component)

As a low-melting component fiber in a thermoplastic fiber or a low-melting component in a conjugated fiber, it is preferable to use a polyolefin resin having a melting point of 130° C. or less as measured at a temperature increasing rate of 10° C./min with a differential scanning calorimeter, from the viewpoint of economy in thermal efficiency, because it can be thermally fused (thermoformed) with an expanded molded article formed of resin expanded particles at a relatively low temperature. Specifically, it is possible to use, for example, an ethylene resin such as a low density polyethylene, a linear low density polyethylene, a high density polyethylene or ethylene-vinyl acetate, and a random or block copolymerized polypropylene which is a binary or ternary copolymer of an alpha olefin, such as ethylene or butene, and propylene. Among these polyolefin resins, a low density polyethylene, a linear low density polyethylene and a high density polyethylene are preferred from the viewpoint of their clear melting point and temperature-sensitive melting behavior.

(High-Melting Component Fiber or High-Melting Component)

On the other hand, a high-melting component fiber in a thermoplastic fiber or a high-melting component in a conjugated fiber develops a reinforcing effect on an expanded molded article, and is therefore required not to melt both at the temperature during producing a linear composite material and at the molding temperature during in-mold molding the linear composite material as a reinforcing material simultaneously with expandable resin particles (which is the same temperature as that when it is fused and integrated with the expanded molded article). As used herein, the expression "develops a reinforcing effect on an expanded molded article" means that resistance of the fiber-reinforced expanded particle molded article against heat, an external force, such as bending, tension, or impact, or the like applied thereto can be improved as compared with that of an unreinforced expanded molded article. The high-melting component fiber constituting the present invention is preferably formed by a crystalline thermoplastic resin having a melting point higher by 20° C. or more than the low-melting component fiber. When the low-melting component fiber is formed by, for example, a polyolefin resin having a melting point of 130° C. or less as described above, examples of the crystalline thermoplastic resin used for the high-melting component fiber include, but are not limited to, a polypropylene resin such as isotactic polypropylene (i-PP); a polyester resin such as polyethylene terephthalate (PET), polytrimethylene terephthalate (PTT) or polybutylene terephthalate (PBT); and a polyamide resin such as nylon 6 or nylon 66.

<Linear Composite Material>

A reinforcing material of the present invention is produced by first heating a thermoplastic fiber comprising the above-described low-melting component fiber and high-melting component fiber to melt the low-melting component fiber and integrate the low-melting component fiber and the high-melting component fiber so as to provide a linear composite material, and then weaving the linear composite material as two or more threads selected from the group consisting of a warp, a weft and a slant thread. FIG. 3 is a sectional view schematically showing an example structure of a linear composite material 17 obtained by bundling a plurality of the conjugated fibers 13 shown in FIG. 2 (A) as thermoplastic fibers and hot drawing them. When hot drawing two or more conjugated fibers 13, covering layers 12', each of which is a low-melting component of the conjugated fibers 13, are fused and integrated to obtain a linear composite material 17 having a structure in which a high-melting component fiber (hereinafter sometimes referred to as "fibrous reinforcement") 11 developing a reinforcing effect is present in a matrix resin 16 (a thermoplastic resin of the low-melting component constituting the covering layer 12') in the longitudinal section.

The dispersion state of the fibrous reinforcement 11 is not particularly limited. As shown in FIG. 3(A), in the longitudinal section, it may be randomly dispersed in the matrix resin 16, or as shown in FIG. 3(B), some of the high-melting component fibrous reinforcements 11 may be present in contact with each other. As shown in FIG. 3(C), two or more types of fibrous reinforcements (high-melting component fibers) 11a, 11b or 14a, 14b different in material and thickness can be also present in the matrix resin 16.

In FIG. 3 (A) to FIG. 3 (C), each of (14), (14a), and (14b) indicates a fibrous reinforcement with a high-melting component fiber in a single component-mixed linear composite, and 16 indicates a low-melting component fiber which is a matrix resin.

The thickness and shape of the fibrous reinforcement 11 are also not particularly limited. Those having a large diameter as shown in FIG. 3 (C) or those having an oval cross section may be regularly or irregularly arranged in the longitudinal section, or two types of fibrous reinforcements different in shape may be arranged so as to intersect with each other. For the dispersed state of the matrix resin 16 or the fibrous reinforcement 11 (14), voids including those in the interface therebetween may be present.

The stretching conditions of a thermoplastic fiber comprising a low-melting component fiber and a high-melting component fiber each of which is a single component-based fiber ("separate component-based thermoplastic fiber"), or conjugated fiber 13 comprising both components together are not particularly limited, but the stretching temperature is preferably 145° C. or more from the viewpoint of improving the physical properties of fibers. In addition, from the viewpoint of increasing the crystallinity of a high-melting component fiber (fibrous reinforcement 17), the draw ratio is preferably high. However, if the draw ratio is too high, the crystal orientation is disturbed and the crystallinity is thereby decreased. Therefore, a separate two components-based thermoplastic fiber and the conjugated fiber 13 are desirably stretched in multiple stages rather than one stage. When drawing in one stage, since a large draw ratio is applied at once, drawing is started before the object to be drawn enters the heating bath, particularly neck drawing (necking) is extremely started, and as a result, oriented crystals are less likely to be produced.

In the reinforcing material used for fiber-reinforced expanded particle molded article of the present invention, the low-melting component fiber can be composed of a polyolefin resin as described above, and the high-melting component fiber can be formed by a crystalline thermoplastic resin having a melting point higher by 20° C. or more than the polyolefin resin of the low-melting component fiber.

When the melting point of the high-melting component fiber is higher by 20° C. or more than the polyolefin resin of the low-melting component fiber, stretching can be performed by setting the stretching temperature at which the strength can be developed by hot drawing with the polyolefin resin in molten state and without the high-melting component fiber molten.

Furthermore, the thermoplastic fiber is preferably a thermoplastic fiber comprising two or more conjugate fibers comprising a low-melting component and a high-melting component in a monofilament, from the viewpoint of uniform dispersion of a fiber reinforcement in the resulting linear composite material. That is, when the conjugated fiber is used, cost can be reduced without requiring the above-mentioned blending unit and the like.

For example, when forming a linear composite material by two-stage stretching, it is preferable to perform the first stage in warm water and perform the second stage in highly saturated water vapor. Then, the draw ratio in the second stage is preferably set to 1.5 to 2.5, from the viewpoint of improving the crystallinity of the high-melting component fiber (fibrous reinforcement 11). When the draw ratio in the second stage is less than 1.5, the oriented crystals formed in the first stage may be disturbed to decrease the crystallinity. On the other hand, if the draw ratio in the second stage exceeds 2.5, thread breakage may occur, or the oriented crystal may be broken resulting in a decrease in crystallinity.

In the case of forming a linear composite material by two-stage drawing, the drawing ratio in the first stage is not particularly limited, but can be, for example, 4.0 to 10.0. The unstretched yarn 13 is not limited to being stretched in two stages, and may be stretched in three or more stages.

The fibrous reinforcement (high-melting component fiber after stretching) 11 in the linear composite material used for the reinforcing material of the present invention preferably has a crystallinity of the high-melting component fiber of 60% or more as measured at a temperature increasing rate of 30° C./min with a differential scanning calorimeter according to melting calorimetry. If the crystallinity of the fibrous reinforcement 11 is less than 60%, the high-melting component fiber has a high thermal shrinkage and thereby largely shrinks when heated during molding, and the fiber-reinforced expanded particle molded article is therefore likely to warp. However, when the crystallinity of the fibrous reinforcement 1 is 60% or more, it is possible to reduce the strain generated during molding and to produce the fiber-reinforced expanded particle molded article with little heat shrinkage.

The crystallinity of the high-melting component fiber in the linear composite material is defined herein as a value calculated from the melting calorie of the high-melting component fiber measured with a differential scanning calorimeter (DSC). In the calculation of the crystallinity, the literature value of the melting calorie for the complete crystal of the resin constituting the high-melting component fiber was used as 100% of the crystallinity. The measurement was using about 10 mg of the fibrous reinforcement 11, and it was scanned while increasing the temperature at a temperature increasing rate of 30°/min from room temperature to the temperature higher by 30 to 40° C. than the melting point of the high-melting component fiber.

When measuring the melting point of a resin with DSC, the temperature increasing rate is generally set to 10° C./min. However, when determining the difference between the crystallinities inherent in fibers by measuring the melting calories of a product in which oriented crystallization has occurred such as a stretched article, crystallization proceeds during increasing the temperature if the temperature increasing rate is slow, resulting in measuring the melting calorie in a different state from that in the state before the measurement. Accordingly, in the present embodiment, the crystallinity of the fibrous reinforcement (high-melting component fiber after stretching) 11 was defined as a value measured at a temperature increasing rate of 30° C./min.

Furthermore, the linear composite material 17 used in the reinforcing material used for the fiber-reinforced expanded particle molded article of the present invention preferably has a Young's modulus in tension at 120° C. of 7 cN/dtex or more.

If Young's modulus in tension at 120° C. is 7 cN/dtex or more, a high reinforcing effect can be obtained by the fiber reinforcement while the strain generated during molding for fusing and integrating an expanded molded articles can be reduced.

The thermal shrinkage of the linear composite material preferably is 8.5% or less after subjected to dry heat treatment at 140° C. for 30 minutes. If the shrinkage rate is large, the reinforcing material shrinks excessively due to being heated during integration, and the resulting molded product is likely to warp or wrinkle.

(Measurement of Thermal Shrinkage of Linear Composite Material)

The thermal shrinkage of the linear composite material was measured as follows. A measurement sample having a gripping part at one end of the linear composite material and a loop for hanging a load weight at the other end was first prepared; the gripping part of the linear composite material was attached to a gripper in a drying oven; the linear composite material was marked with two gauge lines of 500 mm in distance therebetween with a load weight of 0.25 g/dtex suspended depending on the fineness of the linear composite material and was then heated to 140° C. in the oven for 30 minutes with the load weight removed; the load weight was suspended again; and the distance (A mm) between the gauge lines was measured. The thermal shrinkage was determined by the following equation.

$$\text{Thermal shrinkage}=[(500-A)/500]100(\%)$$

The average value of 20 measurements was taken as the thermal shrinkage of linear composite material.

<Weaving and Sheeting of Linear Composite Material>

In a fiber-reinforced expanded particle molded article of the present invention, from the viewpoint of effectively reinforcing an expanded particle molded article, it is desirable to arrange the linear composite material in the form of long fibers to be a reinforcing material, and from that viewpoint, it is required to have a woven structure obtained by weaving with a textile weaving loom or the like.

That is, the linear composite material 17 is woven as a warp and a weft, a warp or a weft and a slant thread, or the like to form a reinforcing material.

From the viewpoint of developing physical properties as a reinforcing (reinforcement) fiber and the processability of a reinforcing material, all threads constituting the reinforcing material are preferably a linear composite material 17. FIG. 4(A) is a plan view schematically showing a reinforcing material 20 made of plain weave woven fabric as an example of weaving. The weave of the reinforcing material 20 obtained by weaving a warp 21 and a weft 22 is not particularly limited, and may be appropriately selected from the group consisting of plain weave, diagonal weave (twill weave), satin weave, and a combination thereof as well as a braided fabric, depending on the applications.

In addition, as shown in FIG. 4 (A), the woven fabric may be a sheet-like fabric in which a usual warp and a usual weft are interwoven regularly or randomly alternately. Alternatively, as shown in FIGS. 4 (B) to 4 (D), it may be a sheet-like fabric in which a warp or a weft and a plurality of slant threads 23 arranged not at a right angle but at a slant angle therewith are interwoven (a so-called three-axis braided fabric or a braided fabric having an axis number of four or more); or it may be a sheet-like fabric in which a usual warp and a usual weft and additional slant threads in a plurality of axes are interwoven (a so-called four-axis braided fabric or a sheet-like fabric of a weave having an axis number of five or more). Thus, the fabric suitable in the present invention preferably has a weave in which long fibers including linear composite materials are linearly arranged in multiaxial directions, from the viewpoint of developing physical properties as a reinforcing fiber.

The linear composite material 17 is flat as shown in FIG. 3, and when warping during weaving and when inserting a weft, it is woven with its flat surface (wide surface) facing upward in planar view, as shown in FIGS. 4 (A) to 4 (D). The linear composite material is also woven with its flat surface (wide surface) facing upward, when warping during weaving, when inserting a weft and when inserting a slant thread. In addition, the weave comprising a braided fabric woven from the linear composite material can be subjected to a known heat treatment, for example, inserted between and passed through heat rollers having a surface temperature near the melting point (melting point±15° C.) of the low-melting component fiber or the low-melting component to provide a sheet-like reinforcing material having the intersecting points bonded by adhesion of the low-melting components of the linear composite material with each other. If the temperature is higher than the melting point of the low-melting component plus 15° C., it is difficult to control thickness unevenness of the linear composite material in the longitudinal direction. In contrast, if the temperature is lower than the melting point of the low-melting component minus 15° C., it is difficult to adjust the press conditions, particularly the pressure conditions, and it is difficult to control thickness unevenness of the linear composite material in the width direction.

The thickness of the reinforcing material of the fiber-reinforced expanded particle molded article of the present invention is preferably 0.1 mm or more and 5 mm or less, more preferably 0.5 mm or more and 4 mm or less, and particularly preferably 1 mm or more and 2 mm or less.

When the thickness is 0.1 mm or more, a reinforcing effect can be developed. When it is 5 mm or less, the permeability of the heated vapor is inhibited during in-mold molding of resin expanded particles leading to the longer molding time, without increasing the heat shrinkage of the reinforcing fiber and with no warp or wrinkle in the resulting molded product.

In the formation of an expanded molded article by in-mold molding of resin expanded particles, the sheet-like reinforcing material 20 is placed on the mold surface of at least one mold, the molds are clamped, and expandable resin particles are filled in the cavity. Then, a heating medium such as water vapor is introduced into the cavity to thermally expand the expandable resin particles, during which the heating medium is preferably penetrated (introduced) from both sides in the thickness direction of the expanded molded article from the viewpoint of uniform fusibility of expanded particles in the thickness direction. For the mold for in-mold molding, generally, as the heating medium such as vapor is introduced into the cavity through fine holes provided in at least one of the molds, the heating medium flows from the mold side having the fine holes for introducing the heating medium into the mold side having a reinforcing material provided thereon. Then, when the reinforcing material is breathable, the heating medium can be introduced also from the reinforcing material side into the cavity side, making the physical properties of the expanded molded article uniform (improving in fusibility of expanded particles), shortening the molding time, reducing the mold manufacturing cost and the like.

From this viewpoint, interstices 25 are required to be present near the intersecting point of the reinforcing material, as shown in an enlarged manner in FIG. 5. For the interstices 25 shown in FIG. 5, the interstices 25 are generated at the intersecting point 24 of a warp 21 and a weft 22 by forming a weave, and the interstices 25 are distributed throughout the woven fabric because all the adjacent intersecting points have the corners thereof where two or more threads intersect with each other.

<Method for Producing Fiber-Reinforced Expanded Particle Molded Article>

The method for producing a fiber-reinforced expanded particle molded article of the present invention will be then described.

The method for producing a fiber reinforced expanded particle molded article of the present invention is a method comprising: setting a reinforcing material on the mold surface of one of first and second molds with both molds open and clamping molds; then filling expandable resin particles in a cavity formed by the first and second molds; and introducing a heating medium into the cavity at least through vent holes open on the mold surface of the mold not having the reinforcing material set to thermally expand the expandable resin particles to produce the fiber-reinforced expanded particle molded article. The method is characterized that: the reinforcing material used is a reinforcing material comprising a high-melting component fiber that does not melt at the in-mold molding temperature of the expanded molded article and a matrix component that is interposed between the high-melting component fibers and melts at the in-mold molding temperature; and the expandable resin particles filled in the cavity are expanded by the heating medium at the in-mold molding temperature to fuse resin expanded particles together, while the matrix component of the reinforcing material adjoining the expanded molded article is molten to fuse and integrate the reinforcing material with the surface of the expanded molded article.

Hereinafter, the production method according to the present invention will be illustrated with reference to drawings. An example using vapor as a heating medium will be described. FIG. 6 is a cross-sectional view showing the first mold 30 and the second mold 40 opened, with a reinforcing material 2 set on the molding surface of the mold 30 in a vacuum. The mold surface of the first mold 30 has a large number of exhaust holes 35 open, which are generally through holes of 0.05 to 1 mm in diameter. The air on the mold surface of the first mold 30 is led from the exhaust holes 35 through a vacant chamber 36 and an exhaust tube 31 to a vacuum pump (not shown). A cooling water pipe 33 for cooling the reinforcing material layer after molding is also connected to the vacant chamber 36. The reinforcing material 2 can be vacuum molded on the mold surface of the first mold 30 by: heating the reinforcing material to a moldable state in another device not shown; then bringing the front side (outer layer side) close to the mold surface of the mold 30; closing a valve 34 of the cooling water pipe 33; and opening a valve 32 to operate the vacuum pump. The reinforcing material 2 used in the present invention has breathability as describe above, and may thereby be unable to completely fit the mold surface as the case is in the usual vacuum molding. However, if the reinforcing material is mostly set on the mold surface, during expand molding after clamping the molds, the expanding pressure of the resin expanded particles can cause the reinforcing material to be pressed against the mold surface of the mold 30 to provide a reinforcing material for an expanded molded article having a predetermined shape.

The first mold 30 and the second mold 40 are then clamped. Pre-expanded expandable resin particles (beads) are filled in a cavity formed between the first and second molds 30 and 40 mated through a filling tube 49 from a filling machine 50 for filling expandable resin particles attached to the second mold 40.

As shown in FIG. 7, the mold surface of the second mold 40 is perforated with a large number of vent holes 45 facing the molding area for the filled beads. The reinforcing material 2 is maintained breathable through the vent holes 45 even with both the molds 30 and 40 clamped, due to the vapor fed through the vacant chamber 46 from the introduction pipe 41. When a valve 44 of an outlet tube 43 is closed and the valve 42 is opened to introduce vapor into the vacant chamber 46 from the introduction pipe 41, the vapor penetrates between the expandable resin particle (beads) filled directly through the vent holes 45 or via the interstices 25 in the reinforcing material 2 through the vent holes 45, heats and expands the beads, fuses the resulting expanded particles together while melting the matrix component comprising the low-melting component of the reinforcing material 2 adjoining the resulting expanded molded article 3 to fuse and integrate the reinforcing material 2 with the surface of the expanded molded article 3.

Cooling water is then introduced from an introduction pipe 47 into the vacant chamber 46 to cool the expanded molded article; the molds are opened; the fiber-reinforced expanded particle molded article is removed; and the reinforcing material is trimmed, for example, the unnecessary part of reinforcing material is trimmed away to obtain a finished fiber-reinforced expanded particle molded article 1.

Hereinbefore, an example of introducing vapor from the side of the second mold 40 was described, but when vapor is allowed to be introduced also from the side of the first mold 30 and the heated vapor is introduced alternately from both molds, fusibility of the particles together within the expanded particle layer can be improved and the molding cycle can be shortened.

The fiber-reinforced expanded particle molded article of the present invention can be produced by feeding a reinforcing material and an expanded molded article into press molds to press them between the molds and fusing and integrating them by hot pressing at a temperature below the melting point of the reinforcing fiber (high-melting component fiber), the reinforcing material being one produced by preliminarily hot press molding a fabric or a braided product produced by weaving a linear composite material, which is produced by melting and integrating a thermoplastic fiber comprising a low-melting component fiber and a high-melting component fiber so that the low-melting component fiber is a matrix component and the high-melting component fiber is a fiber reinforcement, as two or more threads selected from the group consisting of a warp, a weft and a slant thread; and the expanded molded article being one which has already been molded in a predetermined thickness.

EXAMPLES

Hereinafter, the present invention will be described with reference to Examples but is not to be limited by these Examples in any way.

Example 1

(Preparation of Reinforcing Material)

For a linear composite material, an unstretched conjugated fiber having a high-melting component fiber comprising crystalline polypropylene and a low-melting component fiber comprising a linear low density polyethylene was hot drawn to obtain a linear composite material with a fineness of 2000 dtex, a crystallinity of 72% for the high-melting component fiber (polypropylene) after stretching and a Young's modulus in tension at 120° C. of 13.2 cN/dtex. This polypropylene fiber-reinforced polyethylene fiber (manufactured by UBE EXSYMO CO., LTD.; trade name: SIMTEX, product number: SFE-2000) was used as a warp and a weft to obtain a plain weave fabric with a warp density and a weft density of 15.5 threads/inch and a basis weight of 250 g/m$^2$.

A sheet-like reinforcing material 2 comprising a polypropylene fiber (melting point: 169° C.) as a fiber reinforcement and a polyethylene (LLDPE; melting point: 113° C.) of the low-melting component fiber as a matrix with a thickness of 0.5 mm and a basis weight of 250 g/m$^2$ was obtained.

(Production of Fiber-Reinforced Expanded Particle Molded Article)

An in-mold expand molding machine comprising a first mold (female mold) 30 and a second mold (male mold) 40 as shown in FIG. 6 was prepared. A reinforcing material 2 was charged on the mold surface of the first mold and the molds were then clamped, and the cavity between the molds was filled at a compressibility of 105% with a polypropylene expanded particle (manufactured by KANEKA CORPORATION; trade name: EPERAN PP45; melting point: 145° C.; expansion ratio: 45) through a filling tube 49 from a beads filling machine 50. Thereafter, water vapor at 0.26 MPa (128° C.) was fed through vent holes 45 of the second mold into the cavity between the molds to secondarily expand the polypropylene expanded particles and thus thermally fuse and integrate the secondary expanded particles together and the secondary expanded particles with the reinforcing material 2 in the skin layer of the expanded particle molded article by such an expanding pressure; and the molds were then cooled to obtain a fiber-reinforced expanded particle molded article with a total thickness (thickness of the molded article) of 25 mm and an apparent density of 0.11 g/cm$^3$.

Example 2

A fiber-reinforced expanded particle molded article with a total thickness of 25 mm and an apparent density of 0.07 g/cm$^3$ was obtained by using the same linear composite material as in Example 1 in the same manner as in Example 1 except for using a reinforcing material with a weave density of each of a warp and a weft of 9.3 threads/inch and a basis weight of 150/m$^2$.

Example 3

An expanded article with a thickness of 25 mm was obtained by using the same molds as used in Example 1 and filling only expanded particles without placing a reinforcing material. Two sheets of the reinforcing material 2 used in Example 1 were stacked and fed into hot press molds preheated to 140° C., subjected to a pressure of 1 MPa, and then cooled to 30° C. to obtain a reinforcing material 2A. The reinforcing material 2A was then laminated on one side of the expanded article, fed in hot press molds fitted with a spacer having a thickness of 25 mm and heated to 140° C., subjected to a pressure of 1 MPa, and then cooled to 30° C. to obtain a fiber-reinforced expanded particle molded article with a total thickness of 25 mm and an apparent density of 0.2 g/cm$^3$.

Example 4

A fiber-reinforced expanded particle molded article with a total thickness of 25 mm and an apparent density of 0.05 g/cm$^3$ was obtained by using the same linear composite material as in Example 1 in the same manner as in Example 1 except for using a reinforcing material with a weave density of each of a warp and a weft of 2.5 threads/inch and a basis weight of 48/m$^2$.

Reference Example 1

A fiber-reinforced expanded particle molded article with a total thickness of 25 mm and an apparent density of 0.72 g/cm$^3$ was obtained in the same manner as in Example 1 except the eight sheets of the reinforcing materials used in Example 1 were simply stacked and charged into the molds.

The compositions of Examples and Reference Example as described above and the evaluation results obtained by the following method are summarized in Table 1.

(1) Tensile Test for Linear Composite Material at 120° C.

A heating furnace was used and conditioned under an atmosphere of 120° C. for 1 hour, and a sample was set therein. After 3 minutes (the temperature of the sample reached 120° C. after about 2 minutes), five determinations per a sample were performed under the conditions of a sample length 100 mm and a tensile speed of 100 mm/minute with Autograph AG-100 kNIS (manufactured by Shimadzu Corporation) in accordance with the method provided in JIS L 1013. From the average value thereof, strength (cN/dtex), elongation (%) and Young's modulus (cN/dtex) were determined.

(2) Method for Measuring Crystallinity

The crystallinity was measured by the method described above.

(3) Thermal Shrinkage

The thermal shrinkage was measured by the method described above.

(4) Method for Measuring Air Impermeability of Reinforcing Material Based on the Gurley method provided in JIS P 8117, the time (seconds) for 100 ml of air to pass through a reinforcing material (fabric sheet) under a pressure of 0.879 g/mm$^2$ was measured with a stopwatch. Specifically, it was measured with a B-type Gurley densometer manufactured by Toyo Seisakusho Kaisha, Ltd.

(5) Flexural Rigidity (Flexural Modulus) of Fiber-Reinforced Expanded Particle Molded Article The bending test was performed in accordance with JIS-K-7221 to determine the flexural rigidity (flexural modulus).

First, test specimens with a dimension of 350 mm in length, 100 mm in width and 25 mm in thickness were cut from the resulting molded article and subjected to a 3-point bending test at a distance between the supports of 300 mm and a test rate of 20 mm/min. The elastic modulus was determined from the load deflection curve. The obtained test results were relatively compared to the blank (with expanded molded article only and no reinforcing material), and qualitatively evaluated as follows.

Excellent: exceptionally higher flexural rigidity than the blank.

Good: much higher flexural rigidity than the blank.

Fair: slightly higher flexural rigidity than the blank.

Poor: flexural rigidity of the blank as a standard.

For each of Examples and Reference Example described above, the composition of the conjugated spun fiber, the evaluation of the linear composite material, the composition of the reinforcing material, the evaluation of the reinforcing material, and the fiber-reinforced expanded particle molded article are summarized in Table 1.

| Item | | | Example 1 | Example 2 | Example 3 | Example 4 | Reference Example 1 |
|---|---|---|---|---|---|---|---|
| Composition of sheath-core type conjugated spun fiber | Low-melting component | Type | LLDPE | LLDPE | LLDPE | LLDPE | LLDPE |
| | | Manufacturer name | Prime Polymer Co., Ltd. | Prime Polymer Co., Ltd. | Prime Polymer Co., Ltd. | Prime Polymer Co., Ltd. | Prime Polymer Co., Ltd. |
| | | Grade | 1018G | 1018G | 1018G | 1018G | 1018G |
| | | Melting point (° C.) | 113 | 113 | 113 | 113 | 113 |
| | High-melting component | Type | PP | PP | PP | PP | PP |
| | | Manufacturer name | Prime Polymer Co., Ltd. | Prime Polymer Co., Ltd. | Prime Polymer Co., Ltd. | Prime Polymer Co., Ltd. | Prime Polymer Co., Ltd. |
| | | Grade | S135 | S135 | S135 | S135 | S135 |
| | | Melting point (° C.) | 169 | 169 | 169 | 169 | 169 |
| Evaluation of linear composite material | Basic physical properties | Fineness (dtex) | 2000 | 2000 | 2000 | 2000 | 2000 |
| | | Crystallinity (%) | 72 | 72 | 72 | 72 | 72 |
| | | Young's modulus in tension (cN/dtex) | 13.2 | 13.2 | 13.2 | 13.2 | 13.2 |
| | | Thermal shrinkage (%) | 0.65 | 0.65 | 0.65 | 0.65 | 0.65 |
| Composition of reinforcing material | Weave | Warp density (thread/inch) | 15.5 | 9.3 | 15.5 | 2.5 | 15.5 |
| | | Weft density (thread/inch) | 15.5 | 9.3 | 15.5 | 2.5 | 15.5 |
| | | Basis weight (g/m$^2$) | 250 | 150 | 250 | 48 | 250 |

-continued

| Item | | | Example 1 | Example 2 | Example 3 | Example 4 | Reference Example 1 |
|---|---|---|---|---|---|---|---|
| Evaluation of reinforcing material | Basic physical properties | Number of sheets | 1 | 1 | 2 | 1 | 8 |
| | | Total basis weight (g/m$^2$) | 250 | 150 | 500 | 48 | 2000 |
| | | Thickness (mm) | 0.5 | 0.3 | 1 | 0.15 | 4 |
| | | Air impermeability (second/100 mL) | 0.08 | 0.03 | 0.17 | 0.03 | 0.60 |
| Fiber-reinforced expanded particle molded article | Expanded resin | | PP | PP | PP | PP | PP |
| | Molding method | In-mold integral molding | Good | Good | — | Good | Good |
| | | Hot press molding | — | — | Good | — | — |
| | Thickness of molded article | mm | 25 | 25 | 25 | 25 | 25 |
| | Apparent density | g/cm$^3$ | 0.11 | 0.07 | 0.2 | 0.05 | 0.72 |
| | Flexural rigidity | | Excellent | Good | Excellent | Fair | Excellent |

Example 5

In the production of a fiber-reinforced expanded particle molded article, the same reinforcing material was used as in Example 1, and expanded particles comprising an expandable styrene modified ethylene resin (manufactured by JSP Co., Ltd.; trade name: Elenpol® NEO NB100T) (hereinafter referred to as "polyethylene/polystyrene expanded particles") were used instead of the polypropylene expanded particles used in Example 1 and filled at a compressibility of 105% through a filling tube 49 from a beads filling machine 50. Thereafter, water vapor at 0.26 MPa (128° C.) was fed through vent holes 45 of the second mold into the cavity between the molds to secondarily expand the polyethylene/polystyrene expanded particles and thus thermally fuse and integrate the secondary expanded particles together and the secondary expanded particles with the reinforcing material 2 in the skin layer of the expanded particle molded article by such an expanding pressure; and the molds were then cooled to obtain a fiber-reinforced expanded particle molded article with a total thickness (thickness of the molded article) of 20 mm and an apparent density of 0.047 g/cm$^3$.

Example 6

A fiber-reinforced expanded particle molded article with a total thickness of 20 mm and an apparent density of 0.039 g/cm$^3$ was obtained in the same manner as in Example 5 except for using the same linear composite material as in Example 1 and using a reinforcing material with a weave density of each of a warp and a weft of 9.3 threads/inch and a basis weight of 150/m$^2$ as in Example 2.

Example 7

A fiber-reinforced expanded particle molded article with a total thickness of 20 mm and an apparent density of 0.076 g/cm$^3$ was obtained in the same manner as in Example 5 except the reinforcing material used in Example 1 was placed on each of both molds and the expanded particles were filled among the reinforcing materials.

Example 8

A molded article of expanded particle with a thickness of 20 mm was obtained by using the same molds and filling only polyethylene/polystyrene expanded particles without placing a reinforcing material. The reinforcing material used in Example 1 and the molded article of expanded particle were thermocompression bonded at a pressure of 1 MP in a hot press heated at 140° C. using a spacer having a thickness of 20 mm and cooled to 30° C., in the same manner as in Example 3 to obtain a fiber-reinforced expanded particle molded article with a total thickness of 20 mm and an apparent density of 0.048 g/cm$^3$.

Example 9

A fiber-reinforced expanded particle molded article with a total thickness of 20 mm and an apparent density of 0.034 g/cm$^3$ was obtained in the same manner as in Example 5 except for using the same linear composite material as in Example 1 and using a reinforcing material with a weave density of each of a warp and a weft of 4.5 threads/inch and a basis weight of 72 g/m$^2$.

Comparative Example 1

The same expanded particles as in Example 5 only were filled in the same molds as those used in Example 1 without using a reinforcing material to obtain a molded article of expanded particle with a thickness of 20 mm and an apparent density of 0.030 g/cm$^3$.

Reference Example 2

A fiber-reinforced expanded particle molded article with a total thickness of 20 mm and an apparent density of 0.048 g/cm$^3$ was obtained in the same manner as in Example 5 except for using polystyrene expanded particles (manufactured by JSP Co., Ltd.; trade name: Styorodia® JQ-N) in the cavity.

Comparative Example 2

A molded article with a total thickness of 20 mm and an apparent density of 0.035 g/cm$^3$ was obtained in the same manner as in Comparative Example 1 except that the expanded particles were changed to polystyrene expanded particles (manufactured by JSP Co., Ltd.; trade name: Styorodia® JQ-N).

Evaluation of Fiber-Reinforced Expanded Particle Molded Articles of Examples 5 to 9, Comparative Examples 1 and 2 and Reference Example 2

In addition to the above-described methods for evaluating fiber-reinforced expanded particle molded articles of the Examples 1 to 4 and Reference Example 1, the following evaluations were performed.

(6) Flexural Modulus of Fiber-Reinforced Expanded Particle Molded Article

The bending test was performed in accordance with JIS-K-7221 to determine the flexural modulus.

First, test specimens with a dimension of 300 mm in length, 100 mm in width and 20 mm in thickness were cut from the resulting molded article and subjected to a 3-point bending test at a distance between the supports of 240 mm and a test rate of 20 mm/min. The flexural modulus was determined from the load deflection curve.

(7) Specific Flexural Modulus

The value obtained by dividing the flexural modulus by the apparent density was defined as a specific flexural modulus.

(8) Surface Hardness

The surface hardness was evaluated in accordance with JIS K 7202-2: "Plastics—Determination of hardness—Part 2: Rockwell hardness" under the following measurement conditions (N=5). In the case of a fiber-reinforced expanded particle molded article, the measurement was performed for the surface of the reinforcing material side, and in the case of a molded article without a reinforcing material, the measurement was performed for the surface of the molded article of expanded particle.

(9) Surface Hardness Rockwell Hardness Scale: R

The surface hardness was measured under the conditions of a standard load of 10 kg, a test load of 60 kg and a steel ball indenter diameter of 12.7 mm (N=5).

(10) Peel Strength

The adhesion of the reinforcing material was evaluated using a rotating drum-type support fitting for measuring a peel strength in accordance with JIS C 6471, Method A (peeling in the direction of 90°) (N=5). The measurement conditions are as follows.

Speed: 50 mm/min, sample width: 10 mm, test distance: 60 mm. Measurement results were shown in terms of values per mm.

For each of the Examples 5 to 9, Comparative Examples 1 and 2 and Reference Example 2, the composition of the conjugated spun fiber, the evaluation of the linear composite material, the composition of the reinforcing material, the evaluation of the reinforcing material, and the fiber-reinforced expanded particle molded article are summarized in the following Table 2.

TABLE 2

| Item | | | Example 5 | Example 6 | Example 7 | Example 8 | Example 9 | Comparative Example 1 | Reference Example 2 | Comparative Example 2 |
|---|---|---|---|---|---|---|---|---|---|---|
| Composition of sheath-core type conjugated spun fiber | Low-melting component | Type | LLDPE | LLDPE | LLDPE | LLDPE | LLDPE | — | LLDPE | — |
| | | Manufacturer name | Prime Polymer Co., Ltd. | Prime Polymer Co., Ltd. | Prime Polymer Co., Ltd. | Prime Polymer Co., Ltd. | Prime Polymer Co., Ltd. | — | Prime Polymer Co., Ltd. | — |
| | | Grade | 1018G | 1018G | 1018G | 1018G | 1018G | — | 1018G | — |
| | | Melting point (° C.) | 113 | 113 | 113 | 113 | 113 | — | 113 | — |
| | High-melting component | Type | PP | PP | PP | PP | PP | — | PP | — |
| | | Manufacturer name | Prime Polymer Co., Ltd. | Prime Polymer Co., Ltd. | Prime Polymer Co., Ltd. | Prime Polymer Co., Ltd. | Prime Polymer Co., Ltd. | — | Prime Polymer Co., Ltd. | — |
| | | Grade | S135 | S135 | S135 | S135 | S135 | — | S135 | — |
| | | Melting point (° C.) | 169 | 169 | 169 | 169 | 169 | — | 169 | — |
| Evaluation of linear composite material | Basic physical properties | Fineness (dtex) | 2000 | 2000 | 2000 | 2000 | 2000 | — | 2000 | — |
| | | Crystallinity (%) | 72 | 72 | 72 | 72 | 72 | — | 72 | — |
| | | Young's modulus in tension (cN/dtex) | 13.2 | 13.2 | 13.2 | 13.2 | 13.2 | — | 13.2 | — |
| | | Thermal shrinkage (%) | 0.65 | 0.65 | 0.65 | 0.65 | 0.65 | — | 0.65 | — |
| Composition of reinforcing material | Weave | Warp density (thread/inch) | 15.5 | 9.3 | 15.5 | 15.5 | 4.5 | — | 15.5 | — |
| | | Weft density (thread/inch) | 15.5 | 9.3 | 15.5 | 15.5 | 4.5 | — | 15.5 | — |
| | | Basis weight (g/m²) | 250 | 150 | 250 | 250 | 72 | — | 250 | — |
| | | Number of sheets | 1 | 1 | 2 | 1 | 1 | — | 1 | — |
| | | Total basis weight (g/m²) | 250 | 150 | 500 | 250 | 72 | — | 250 | — |
| Evaluation of reinforcing material | Basic physical properties | Thickness (mm) | 0.5 | 0.3 | 1 | 0.5 | 0.15 | — | 0.5 | — |
| | | Air impermeability (second/100 mL) | 0.08 | 0.03 | 0.17 | 0.08 | 0.03 | — | 0.08 | — |
| Fiber-reinforced expanded particle molded article | Expanded resin | | PE/PSt | PE/PSt | PE/PSt | PE/PSt | PE/PSt | PE/PSt | PSt | PSt |
| | Molding method | In-mold integral molding | Good | Good | Good | — | Good | Good | Good | Good |
| | | Hot press molding | — | — | — | Good | — | — | — | — |
| | Thickness of molded article | mm | 20 | 20 | 20 | 20 | 20 | 20 | 20 | 20 |
| | Expansion ratio of expanded layer | Ratio | 25.7 | 25.7 | 19.2 | 26.0 | 27.0 | 30.0 | 30.0 | 30.0 |
| | Apparent density | g/cm³ | 0.047 | 0.039 | 0.076 | 0.048 | 0.034 | 0.030 | 0.048 | 0.035 |
| | Flexural modulus | MPa | 40 | 33 | 160 | 39 | 30 | 10 | 31 | 15 |
| | Specific flexural modulus | MPa · cm³/g | 851 | 846 | 2105 | 830 | 638 | 213 | 1033 | 750 |
| | Surface hardness | HRR | 110 | 100 | 115 | 110 | 90 | 80 | 56 | 38 |
| | Peel strength | N/mm | 0.63 | 0.60 | 0.71 | 0.57 | 0.61 | — | 0.01 | — |

The fiber-reinforced expanded particle molded article of the present invention has a reinforcing material fused and integrated with the surface of an expanded molded article, and is therefore used as a composite material for an expanded molded article requiring to be reinforced, in various applications such as heat insulating materials, cushioning and packaging materials, automobile interior members and core materials for automobile bumpers which have properties such as lightweight properties, heat insulating properties, sound absorbency, surface hardness, flexural rigidity and shock absorption.

In addition, the method for producing a fiber-reinforced expanded particle molded article of the present invention enables a reinforcing material to be fused and integrated with an expanded molded article during in-mold molding the expanded molded article, and can therefore be used effectively as a method for producing a fiber-reinforced expanded particle molded article with a high reinforcing effect at low cost.

DESCRIPTION OF REFERENCE NUMERALS

1 Fiber-reinforced expanded particle molded article
2 Reinforcing material
3 Expanded molded article
11 High-melting component fiber
11' Unstretched high-melting component fiber
12' Unstretched low-melting component fiber
13 Unstretched conjugated fiber
14 High-melting component fiber
14' Unstretched high-melting component fiber (single-component fiber)
15 Low-melting component fiber
15' Unstretched low-melting component fiber (single-component fiber)
16 Fused (matrixed) low melting component
17 Linear composite material
20 Woven fabric (reinforcing material)
21 Warp
22 Weft
23 Slant thread
24 Intersecting point
25 Interstices near the corners of a intersecting point
30 First mold
31 Exhaust tube
32 Valve
33 Cooling water pipe
34 Valve
35 Exhaust hole
40 Second mold
41 Vapor introduction pipe
42 Valve
43 Outlet tube
44 Valve
45 Vent hole
46 Vacant chamber
47 Cooling water pipe
48 Valve
49 Filling tube
50 Filling machine

The invention claimed is:

1. A fiber-reinforced expanded particle molded article having a reinforcing material fused and integrated with at least one surface of an expanded molded article formed of a resin expanded particle,
   wherein the reinforcing material is a fabric or a braided product produced by weaving a linear composite material produced by melting and integrating a thermoplastic fiber comprising a low-temperature melting component fiber as a matrix component and a high-temperature melting component fiber as a fiber reinforcement, as two or more threads selected from the group consisting of a warp, a weft and a slant thread,
   wherein the reinforcing material is in the form of a sheet produced by fusing and integrating intersecting points where two or more threads intersect with each other after weaving the linear composite material satisfying the following requirements (i) to (iv); the reinforcing material has a thickness of 0.1 mm or more and 5 mm or less; and the matrix component of the reinforcing material and the surface of the expanded molded article are fused and integrated during in-mold molding, and
   wherein the low-temperature melting component fiber of the linear composite material comprises a polyolefin resin; the high-temperature melting component fiber of the linear composite material comprises a crystalline thermoplastic resin having a melting point that is 20° C. or more than a melting point of the polyolefin resin; and the resin expanded particle is an expanded particle having an outer layer comprising a polyolefin resin that can be fused with the matrix component composed of the low-temperature melting component fiber at least on the surface thereof:
   (i) the linear composite material comprises one or more high temperature melting component fibers;
   (ii) the high temperature melting component fiber of the linear composite material has a crystallinity of 60% or more as measured at a temperature increasing rate of 30° C./min with a differential scanning calorimeter according to melting calorimetry;
   (iii) the linear composite material has a Young's modulus in tension at 120° C. of 7 cN/dtex or more; and
   (iv) the linear composite material has a shrinkage of 8.5% or less after dry heat treatment at 140° C. for 30 minutes, and the reinforcing material is fused and integrated with the surface of the expanded molded article.

2. The fiber-reinforced expanded particle molded article according to claim 1, wherein the expanded particle is a multilayered expanded particle comprising a core layer and an outer layer covering an outer periphery of the core layer, the core layer being a crystalline polyolefin resin and the outer layer comprising a polyolefin resin having a melting point lower by 5 to 60° C. than the core layer.

3. The fiber-reinforced expanded particle molded article according to claim 1, wherein the reinforcing material has a woven structure of the linear composite material in the form of any weave selected from the group consisting of plain weave, satin weave or diagonal weave or a combination thereof.

4. A method for producing a fiber-reinforced expanded particle molded article, the method comprising: setting a reinforcing material on a mold surface of at least one of first and second molds with both molds open and clamping the molds; then filling a expandable resin particle in a cavity formed by the first and second molds; and introducing a heating medium into the cavity through vent holes open on the mold surface of the mold to thermally expand the expandable resin particle,
   wherein the reinforcing material used is in the form of a sheet produced by fusing and integrating intersecting points where two or more threads intersect with each other after weaving a linear composite material satisfying the following requirements (i) to (iv); the reinforcing material has a thickness of 0.1 mm or more and 5 mm or less; and wherein the linear composite material comprising a high-temperature melting component fiber that does not melt at an in-mold molding temperature of an expanded molded article and a matrix component that is interposed between the high-temperature melting component fibers and melts at the in-mold molding temperature; and the expandable resin particles filled in the cavity are expanded by the heating medium at the in-mold molding temperature to fuse resin expanded particles together, while the matrix component of the reinforcing material adjoining the expanded molded article is molten to fuse and integrate the reinforcing material with the surface of the expanded molded article, and wherein the low-temperature melting component fiber of the linear composite material comprises a polyolefin resin; the high-temperature melting component fiber of the linear composite material comprises a crystalline thermoplastic resin having a melting point that is 20° C. or more than a melting point of the polyolefin resin; and the resin expanded particle is an expanded particle having an outer layer comprising a polyolefin resin that can be fused with the matrix component composed of the low-temperature melting component fiber at least on the surface thereof:

(i) the linear composite material comprises one or more high melting component fibers;
(ii) the high melting component fiber of the linear composite material has a crystallinity of 60% or more as measured at a temperature increasing rate of 30° C./min with a differential scanning calorimeter according to melting calorimetry;
(iii) the linear composite material has a Young's modulus in tension at 120° C. of 7 cN/dtex or more; and
(iv) the linear composite material has a shrinkage of 8.5% or less after dry heat treatment at 140° C. for 30 minutes.

5. The method for producing a fiber-reinforced expanded particle molded article according to claim 4, wherein the first and second molds have the vent holes open on the mold surfaces thereof; the vent holes on the mold surfaces of the molds make an opening system alternately or the vent holes on the mold surface of one of the molds make an opening system; and heated vapor is fed toward the mold surface of the mold of the opening system through the vent holes on the other mold surface, for in-mold molding.

* * * * *